Oct. 25, 1949.　　　　R. A. SHIELDS　　　2,486,331
SPOT WELDING APPARATUS
Filed May 6, 1948　　　　　　　　　　　2 Sheets-Sheet 1
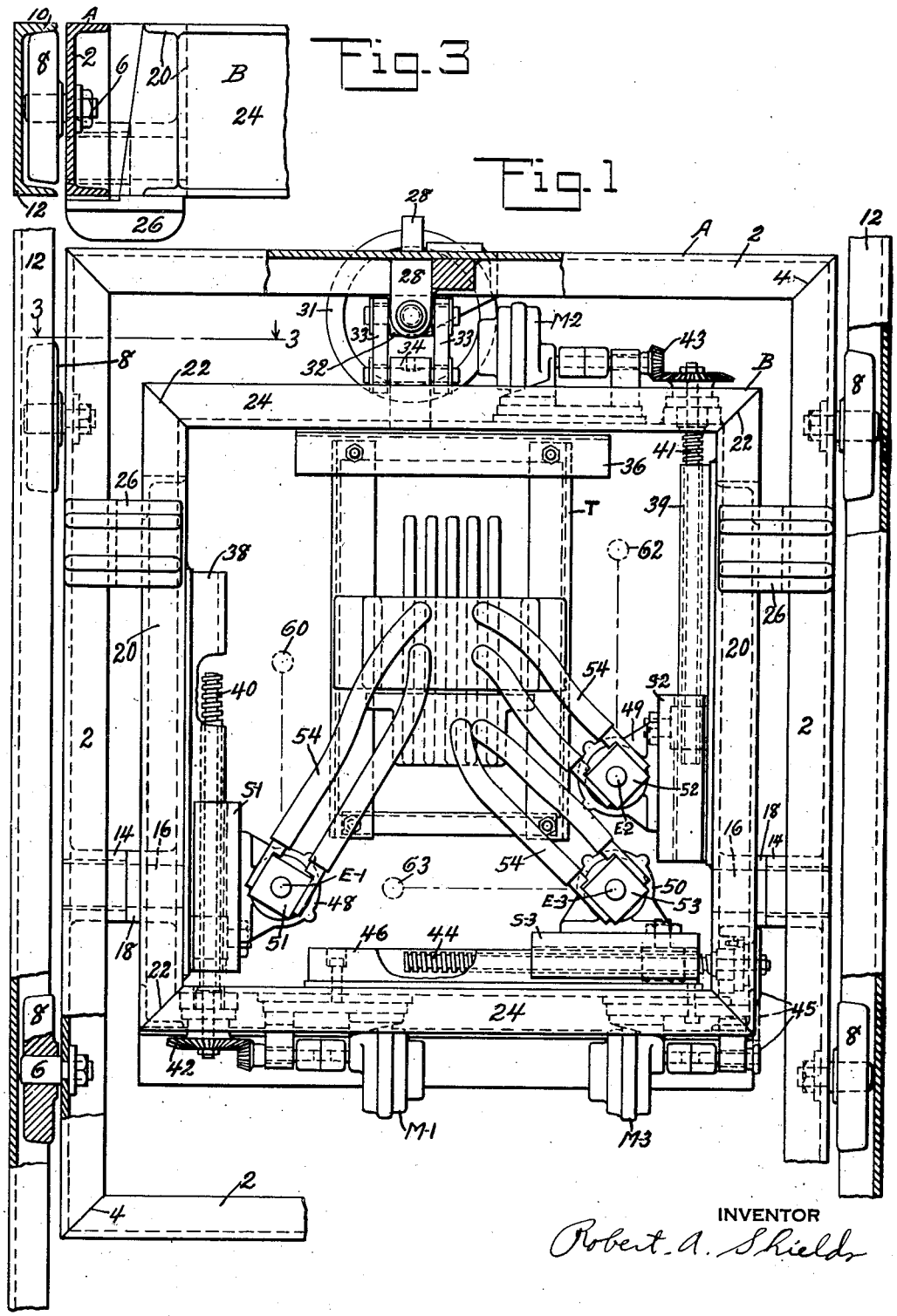
INVENTOR
Robert A. Shields

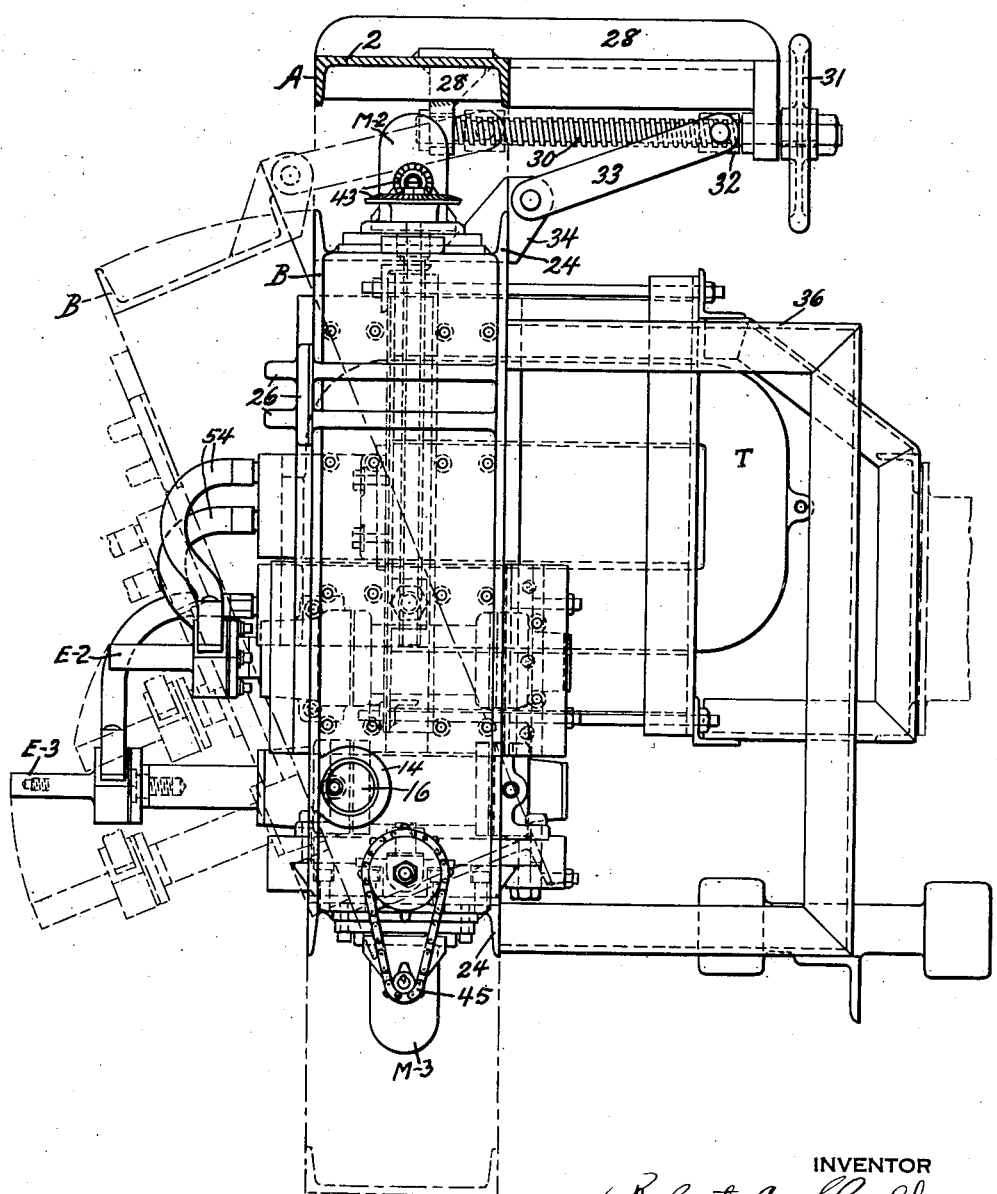

Patented Oct. 25, 1949

2,486,331

UNITED STATES PATENT OFFICE 2,486,331

SPOT WELDING APPARATUS

Robert A. Shields, Bloomsburg, Pa., assignor to American Car and Foundry Company, New York, N. Y., a corporation of New Jersey Application May 6, 1948, Serial No. 25,321

11 Claims. (Cl. 219—4)

This invention relates to spot welding apparatus in general and in particular to such apparatus for use in connection with the spot welding of large structures, such as railway passenger cars.

In the welding of large structures, such as railway cars, it is necessary that the welding apparatus be made extremely flexible so as to accommodate all possible changes in position of the framing members. It is also necessary that the electrical connections be made as simple and compact as possible in order to eliminate electrical losses in the connections and the choking effect due to the large mass of magnetic material adjacent the electrodes. It is an object, therefore, of the present invention to provide a spot welding apparatus having extreme flexibility and adaptability to various structural arrangements.

A further object of the invention is the provision of a spot welding apparatus in which short electrical connections may be permanently made between the transformer electrode tips.

A still further object of the invention is the provision of a spot welding apparatus having a minimum number of electrodes shiftable relative to the transformer and capable of welding all possible angular framing positions.

A yet further object of the invention is the provision of a flexible spot welding apparatus which may be utilized either for series welding or multiple electrode projection welding.

These and other objects of the invention will be apparent to persons skilled in the art from a study of the following description and accompanying drawings, in which Fig. 1 is a front elevational view of portions of the apparatus with parts broken away to better disclose the construction;

Fig. 2 is a side elevational view with parts broken away to better disclose the onstruction, and Fig. 3 is a sectional view taken on line 3—3 of Fig. 1.

Referring now to the drawings in general, it will be seen that the apparatus in general is composed of a vertically shiftable carriage A in which is mounted a tiltable frame B, which latter frame carries the transformer T. The vertically shiftable carriage A is made up of channel members 2 having the flanges beveled and welded together as at 4. Holes are drilled through the webs of the side pieces of this carriage in order to receive stub axles 6 upon which are rotatably mounted wheels 8 adapted to bear against flanges 10 of vertically extending channels 12. These vertically extending channels 12 may be rigidly mounted within the shop, but it is preferred that they be rigidly mounted on a horizontally shiftable carriage, such as that disclosed in Patent 2,190,692. In this manner the channels 12 can be shifted in the shop and the welding apparatus moved along the work in a manner exactly like that described in Patent 2,190,692.

Welded or otherwise secured within the side pieces of the carriage are bearing members 14 through which are extended shafts 16, which in turn project into bearings 18 welded or otherwise secured to the vertically extending channels 20. These channels 20 have their flanges directed outwardly and their ends beveled for weldment as at 22 to similarly disposed top and bottom channels 24. The channels 20 and 24 together form the tiltable frame B which, as described, is trunnioned on the shafts 16 for tilting movement relative to the vertically shiftable carriage A. As a safety means stops 26 are welded or otherwise attached to the front flanges of channels 20 and are adapted to contact the flanges of carriage sides 2, thus the tiltable frame B is limited in its rotation in one direction by stops 26. In order to definitely control the tilting movement of the frame B brackets 28 are welded or otherwise attached to the top member 2 of carriage A and these brackets rotatably carry a lead screw 30 adapted to be rotated by hand wheel 31. A trunnion nut 32 is adapted to be driven along the lead screw during its rotation and this trunnion nut is connected by links 33 to a bracket 34 welded or otherwise secured to the top channel 24 of the tiltable frame B; thus rotation of the hand wheel will cause definite tilting of the tiltable frame B with respect to the vertically shiftable carriage A to which the frame B is trunnioned.

Rigidly mounted within the tiltable frame B by framework 36 is the transformer T, previously referred to, and this transformer will be supplied by relatively high voltage primary leads (not shown). Slideways 38 and 39 are welded or otherwise secured to the vertically extending channels 20 and have mounted therein lead screws 40 and 41 respectively. These lead screws are journaled in the slideways and in bearings attached to the end channels 24 and are adapted to be driven by beveled gearings 42 and 43 respectively. The gearing 42 is adapted to be driven by a power means M—1, while the gearing 43 is adapted to be driven by a power means M—2, these power means being rigidly mounted between the flanges of the end channels 24. A third power means M—3 is also rigidly mounted between the flanges of the bottom channel member and is adapted to drive a lead screw 44 by means of chain or similar drive 45. The lead screw 44 is journaled in the channel 20 and also in the slideway 46 rigidly secured to the bottom channel 24 of the tiltable frame B. Slidably mounted upon the slideways 38, 39 and 46 are slides S—1, S—2 and S—3 respectively and these slides are adapted to be driven and positively controlled by the lead screws 40, 41 and 44 respectively driven by the power means M—1, M—2 and M—3. Rigidly mounted upon the slideways are electrode cylinders 48, 49 and 50, to the pistons of which are rigidly fastened electrode holders 51, 52 and 53 respectively. These electrode holders have removably attached thereto electrode tips E—1, E—2 and E—3; thus it will be seen that upon actuation of the pistons in the slide carried cylinders the electrode tips E—1, E—2 and E—3 may be projected outwardly or withdrawn as desired. Welding current is supplied to the electrode tips by short flexible leads 54 which are connected to the transformer T. These flexible leads also preferably carry the cooling water to the electrode tips and also spray water in case it is desired to spray water on the work during welding to prevent damage to the work.

It will be seen that the slide S—1, together with its cylinder and electrode E—1, can be shifted vertically by power means M—1 from the full line position of Fig. 1 to the terminal line and dash position indicated at 60. Also, the slide S—2, together with a cylinder 49 and electrode E—2, can be shifted vertically by power means M—2 from its full line position to the terminal position indicated at 62. In a similar manner the slide S—3, together with cylinder 50 and electrode E—3, may be shifted horizontally by power means M—3 from the full line position to the terminal position indicated at 63.

It will be seen from the preceding that substantially any desired horizontal spacing between electrode tips E—1 and E—3 can be obtained by leaving E—1 in its lower position and shifting E—3 relative thereto. Likewise, substantially any desired vertical spacing can be obtained by holding E—3 in its full line position and shifting E—2 relative thereto. In cases where framing members would incline upwardly to the right of Fig. 1, any angular placement can be welded by shifting electrode E—2 relative to electrode E—1, or in cases where closer spacing of electrode tips is desired, or steeper angular relationships, this may be obtained by shifting electrodes E—2 and E—3 relative to each other. In cases where the framing members incline upwardly to the left of Fig. 1, flat angular arrangements may be accommodated by shifting E—1 relative to E—2, while steeper angular relations and closer electrode spacing may be taken care of by shifting electrodes E—1 and E—3 relative to each other. Thus it will be seen that by proper manipulation of electrodes E—1, E—2 and E—3 it is possible to weld framing members irrespective of their angular placement. For example, Patent 830,922 discloses a car composed, as all cars are, of horizontal and vertical members joined by one or more inclined members having varying degrees of inclination. With the electrode arrangement described the car of Patent 830,922 could be fabricated without any difficulty due to the flexibility of the electrode arrangement.

In most cases series welding is satisfactory and is accomplished by using any two of the electrodes by projecting the pistons in their cylinders. For examples, E—1 can be paired with E—3, while E—2 is retained in its withdrawn position, all as shown in full lines of Fig. 2. In cases where parallel welding is desired all electrodes can be projected but one, such as E—1, will be provided with a flat contact face, while E—2 and E—3 will be provided with the usual welding tip, thus the current will flow from both E—2 and E—3 through the work and return to the transformer through the flat tip of E—1 which will not make a weld at this point. In other words, the machine in addition to its extreme mechanical flexibility can also be used for either series or parallel welding.

While the apparatus has been described more or less in detail with particular reference to the drawings, it will be seen that various modifications and rearrangements of parts may be made without departing from the scope of the invention as defined in the following claims.

What is claimed is:

1. In a spot welding apparatus the combination of a frame having a plurality of sides, an electrode tip carried by each of at least three of said sides, means to shift each tip along its respective side to vary the spacing and angular relationship of said tips, a source of welding current, and flexible leads connecting said source with said electrode tips.

2. In a spot welding apparatus the combination of a frame having a plurality of sides, slideways secured to each of at least three of said sides, a slide mounted on each of said slideways, an electrode tip assembly carried by each slide, a source of welding current connected to each electrode tip assembly, and means to shift each slide along its respective slideway to vary the spacing and angular relationship of said electrode tips.

3. In a spot welding apparatus the combination of a frame having a plurality of sides, slideways secured to each of a least three of said sides, a slide mounted on each of said slideways for movement therealong, an electrode tip assembly carried by each slide and including an electrode tip projectable substantially at right angles to the direction of movement of said slide, a source of welding current connected to each electrode tip, and independent means to shift each slide and to project each tip relative to its respective slideway.

4. In a spot welding apparatus the combination of a frame having a plurality of sides, slideways secured to each of at least three of said sides, a slide mounted on each of said slideways for movement therealong, an electrode tip assembly carried by each slide and including an electrode tip projectable substantially at right angles to the direction of movement of said slide, a source of welding current connected to each electrode tip, power means to shift each slide along its respective slideway to vary the spacing and angular relationship of said electrode tips, and additional power means to project each electrode tip independently of the other whereby two tips may be projected for series welding and three tips for parallel welding.

5. In a spot welding apparatus the combination of substantially vertically extending guides, a carriage vertically shiftable in said guides, a frame trunnioned in said carriage for tilting movement, means connected to said carriage and frame to control the tilting movements thereof, three electrode tips carried by said frame and shiftable relative thereto substantially in the plane thereof, a source of welding current connected to said electrode tips, and power means to independently shift said electrode tips relative to each other.

6. In a spot welding apparatus the combination of a vertically shiftable carriage, a substantially rectangular frame trunnioned in said carriage for tilting movement relative thereto, means connected to said carriage and frame to control the tilting movements thereof, an electrode tip slidably carried by each of three sides of said rectangular frame, and a source of welding current carried by the fourth side of said frame and flexibly connected to each electrode tip.

7. In a spot welding apparatus the combination of a vertically shiftable carriage, a substantially rectangular frame trunnioned in said carriage for tilting movement relative thereto, means connected to said carriage and frame to control the tilting movements thereof, a slideway fastened to each of three sides of said frame, a slide movable along each slideway substantially parallel to the adjacent side of the frame, an electrode tip carried by each of said slides, a source of welding current flexibly connected to the electrode tips, and means to shift said electrode tips relative to each other whereby the spacing and angular relationship thereof may be varied.

8. In a spot welding apparatus the combination of a vertically shiftable carriage, a substantially rectangular frame trunnioned in said carriage for tilting movement relative thereto, means connected to said carriage and frame to control the tilting movements thereof, a slideway fastened to each of three sides of said frame, a slide movable along each slideway substantially parallel to the adjacent side of the frame, a cylinder and piston assembly carried by each slide, an electrode tip carried by each piston for projection in a direction normal to the movement of its associated slide, a source of welding current carried by the fourth side of said frame and flexibly connected to said electrode tips, and independent power means to independently shift said slides to vary the spacing and angular relationship of the electrode tips and to project the electrode tips for welding.

9. In a spot welding apparatus, a frame, a pair of spaced slideways carried by spaced portions of said frame, an intermediate slideway supported by an intermediate portion of said frame, a slide mounted on each of said slideways, an electrode tip assembly carried by each slide, a source of welding current connected to each electrode tip assembly, and means to independently shift each slide along its slideway to vary the spacing and angular relationship of said electrode tips.

10. In a welding apparatus, a pair of spaced guide-rails, a carriage mounted for movement along said guide-rails, a tiltable frame on said carriage, said frame including a pair of spaced frame members and a connecting member, a pair of slideways mounted on said spaced frame members, a slideway carried by said connecting member, slide members arranged on said slideways, independently controlled power actuated means extending longitudinally of each of the slideways and connected to said slide members for moving said slide members on said slideways, electrode tips carried by each slide, a source of welding current, and means including flexible leads connecting said source with said electrode tips.

11. In a welding apparatus, a pair of spaced guide-rails, a carriage mounted for movement along said guide-rails, a tiltable frame on said carriage, said frame including a pair of spaced frame members and a connecting member, a slideway mounted on each of said spaced frame members, a slideway carried by said connecting member, slide members arranged on said slideways, independently controlled power actuated means for operating each of said slide members on its slideway, each of said means including a driven screw member extending longitudinally of the slideways and a nut carried by the associated slide, electrode tips carried by each slide, a source of welding current, and means including flexible leads connecting said source with said electrode tips.

ROBERT A. SHIELDS.

REFERENCES CITED

The following references are of record in the file of this patent:

UNITED STATES PATENTS

| Number | Name | Date |
|---|---|---|
| 2,177,831 | Kawnitz et al. | Oct. 31, 1939 |
| 2,221,187 | Gunn et al. | Nov. 12, 1940 |
| 2,339,826 | Weightman | Jan. 25, 1944 |

FOREIGN PATENTS

| Number | Country | Date |
|---|---|---|
| 656,305 | France | Jan. 2, 1929 |